(12) United States Patent
Moravek et al.

(10) Patent No.: US 11,498,668 B2
(45) Date of Patent: Nov. 15, 2022

(54) SYSTEMS AND METHODS TO PERFORM TRACK AND BALANCE FOR ROTORCRAFTS

(71) Applicant: Honeywell International Inc., Morris Plains, NJ (US)

(72) Inventors: Patrik Moravek, Czech (CR); Pavel Badin, Dolni Kounice (CR); Michal Dobes, Olomouc (CR)

(73) Assignee: HONEYWELL INTERNATIONAL S.R.O., Prague (CZ)

( * ) Notice: Subject to any disclaimer, the term of this patent is extended or adjusted under 35 U.S.C. 154(b) by 322 days.

(21) Appl. No.: 16/855,113

(22) Filed: Apr. 22, 2020

(65) Prior Publication Data

US 2021/0331788 A1    Oct. 28, 2021

(51) Int. Cl.
*B64C 27/00* (2006.01)
*B64D 47/08* (2006.01)

(52) U.S. Cl.
CPC ............ *B64C 27/008* (2013.01); *B64D 47/08* (2013.01)

(58) Field of Classification Search
CPC ...... B64C 27/008; B64C 27/006; B64D 47/08
See application file for complete search history.

(56) References Cited

U.S. PATENT DOCUMENTS 3,515,485 A * 6/1970 Frank .................... B64C 27/008
                                                        416/61
8,812,255 B2   8/2014 Lynch et al.
9,696,232 B2   7/2017 Hiatt
9,758,243 B1   9/2017 Potts et al.
9,815,565 B1 * 11/2017 Fox ...................... G01C 21/165
(Continued)

FOREIGN PATENT DOCUMENTS

EP          2576344 A2      4/2013
EP          2738090 B1 *    6/2019  ........... B64C 27/008
WO    WO-2012021202 A2 *    2/2012  ........... B64C 27/001

OTHER PUBLICATIONS

Boleslaw Stasicki, "Application of high-speed videography for in-flight deformation measurements of aircraft propellers", Nov. 2008, International Society for Optical Engineering, (Year: 2008).*

*Primary Examiner* — Peter D Nolan
*Assistant Examiner* — Kenneth M Dunne
(74) *Attorney, Agent, or Firm* — Bookoff McAndrews, PLLC

(57) ABSTRACT

According to certain aspects of the disclosure, a computer-implemented method may be used for rotorcraft track and balance. The method may include capturing one or more images of at least one rotating blades of a rotorcraft and analyzing the one or more images of the at least one rotating blades to determine blade information. Additionally, the method may include determining a location of the at least one rotating blades in the one or more images based on the blade information and calculating blade position information based on the determined location of the at least one rotating blade and a parameter of a user device capturing the one or more images. Additionally, the method may include displaying the blade position information to the user device and displaying instructions on one or more adjustments to the at least one rotating blades of the rotorcraft based on the blade position information.

20 Claims, 10 Drawing Sheets

(56) References Cited

U.S. PATENT DOCUMENTS

| | | | |
|---|---|---|---|
| 2015/0112637 A1* | 4/2015 | Hiatt | B64C 27/008 |
| | | | 702/182 |
| 2018/0072405 A1* | 3/2018 | Dock | B64F 5/60 |
| 2021/0179263 A1* | 6/2021 | Sayyah | B64C 27/008 |
| 2021/0362846 A1* | 11/2021 | Petillon | G05D 1/0669 |
| 2021/0394920 A1* | 12/2021 | Dunning | B64C 27/008 |

* cited by examiner

SYSTEMS AND METHODS TO PERFORM TRACK AND BALANCE FOR ROTORCRAFTS

GOVERNMENT CONTRACT

The project leading to this application has received funding from the Clean Sky 2 Joint Undertaking under the European Union's Horizon 2020 research and innovation programme under grant agreement No 807081.

TECHNICAL FIELD

Various embodiments of the present disclosure generally relate performing maintenance procedures on vehicles and more particularly, to integrate mobile devices to mandatory maintenance procedures to effectively perform track and balance maintenance for rotorcrafts.

BACKGROUND

One routine maintenance item facing the rotorcraft industry is the issue of rotor track and balance (RT&B). Rotorcrafts such as helicopters may require track and balance to be performed on the rotors following every major rotor maintenance intervention, blade replacement, or according to defined time intervals. Helicopter rotor track and balance is currently a major high-cost maintenance item. Smoothing vibrations in helicopters may involve an extensive amount of maintenance man-hours and aircraft flight hours. High maintenance time eats away at the life-cycle usefulness of the aircrafts, burns high cost fuel, and detracts from operational readiness of the aircraft. While there are various approaches to performing RT&B, there are negatives to those approaches. For example, equipment used to perform RT&B may be expensive and prone to failures. In some cases, modification of helicopter's rotor tips may be required to enable equipment installation.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF DISCLOSURE

According to certain aspects of the disclosure, systems and methods are disclosed to perform track and balance maintenance procedures on rotorcrafts using mobile devices.

In one embodiment, a computer-implemented method may be used for rotorcraft track and balance. The method may include capturing, by one or more processors, one or more images of at least one rotating blades of a rotorcraft; analyzing, by the one or more processors, the one or more images of the at least one rotating blades of the rotorcraft to determine blade information; determining, by the one or more processors, a location of the at least one rotating blades in the one or more images based on the blade information; calculating, by the one or more processors, blade position information based on the determined location of the at least one rotating blade and a parameter of a user device capturing the one or more images; displaying, by the one or more processors, the blade position information to the user device; and displaying, by the one or more processors, instructions on one or more adjustments to the at least one rotating blades of the rotorcraft based on the blade position information.

According to still another aspect of the disclosure, a computer system for rotorcraft track and balance may include a memory having processor-readable instructions stored therein and a processor configured to access the memory and execute the processor-readable instructions to perform a plurality of functions. The functions may include capture one or more images of at least one rotating blades of a rotorcraft; analyze the one or more images of the at least one rotating blades of the rotorcraft to determine blade information; determine a location of the at least one rotating blades in the one or more images based on the blade information; calculate blade position information based on the determined location of the at least one rotating blade and a parameter of a user device capturing the one or more images; display the blade position information to the user device; and display instructions on one or more adjustments to the at least one rotating blades of the rotorcraft based on the blade position information.

According to another aspect of the disclosure, a non-transitory computer-readable medium containing instructions for rotorcraft track and balance. The instructions may include capturing, by one or more processors, one or more images of at least one rotating blades of a rotorcraft; analyzing, by the one or more processors, the one or more images of the at least one rotating blades of the rotorcraft to determine blade information; determining, by the one or more processors, a location of the at least one rotating blades in the one or more images based on the blade information; calculating, by the one or more processors, blade position information based on the determined location of the at least one rotating blade and a parameter of a user device capturing the one or more images; displaying, by the one or more processors, the blade position information to the user device; and displaying, by the one or more processors, instructions on one or more adjustments to the at least one rotating blades of the rotorcraft based on the blade position information.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1A:
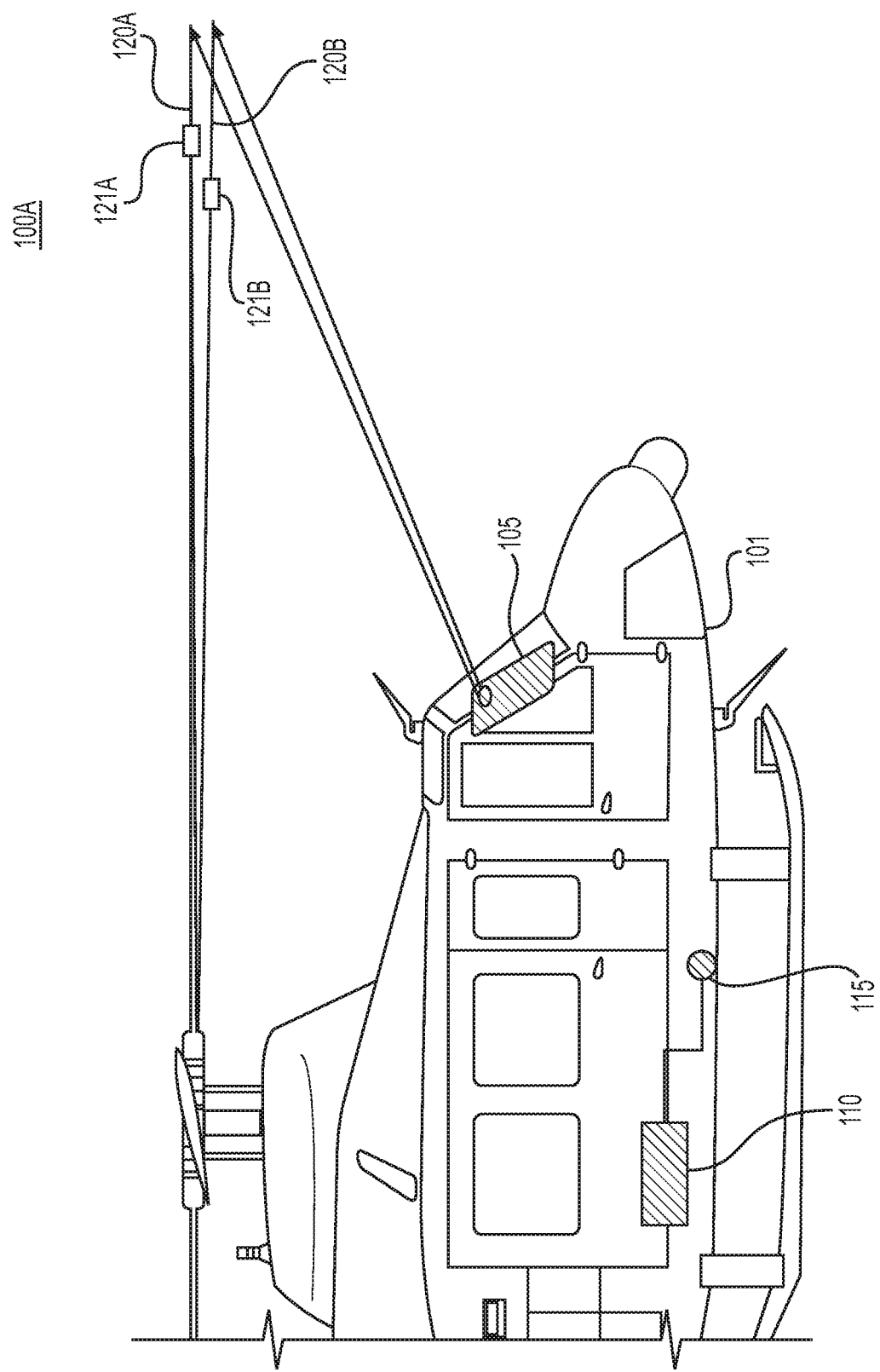
FIGS. 1A and 1B depict an exemplary environment in which systems, methods, and other aspects of the present disclosure may be implemented.

As disclosed above, rotor blade track and balance is a mandatory maintenance procedure on rotorcrafts such as helicopters. Track and balance procedure may require specialized equipment that are expensive and often prone to failures. The specialized equipment may also require modification to the rotor blades.

Therefore, a need exists for a track and balance procedure involving mobile and/or portable devices equipped with camera and wireless communication. The mobile and/or portable device may also include software that performs the track and balance procedure to align rotor blades into a common plane and monitors the balance of the rotor blades to reduce the vibration caused by the rotors of the helicopter.

With respect to the current disclosure, the term "track" may refer to the actual vertical location of each blade tip while the rotor is spinning. When the tips of each blade are all passing through the same plane, the rotorcraft may be determined to have a perfect track. The term "balance" may refer to both the mass balance and the aerodynamic balance of the rotor.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Figure 1B:
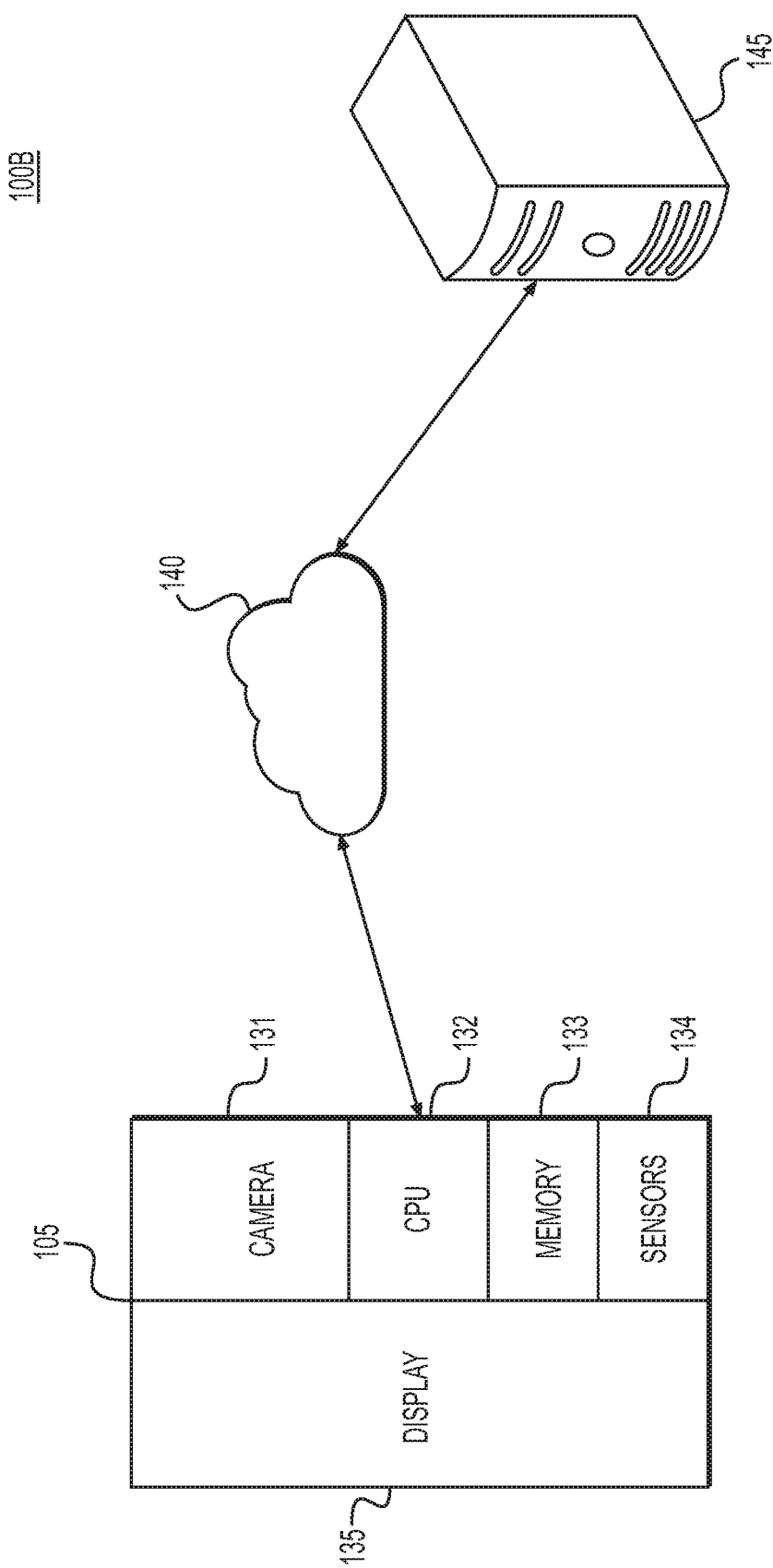

Referring now to the appended drawings, FIGS. 1A and 1B depict an exemplary environment 100A and 100B in which systems, methods, and other aspects of the present disclosure may be implemented. Environment 100A may include a rotorcraft 101 (i.e. helicopter) having two or more rotor blades 120A-120B, and may represent the location of the blades at different points in time. Environment 100A may also include a mobile device 105, vehicle data unit 110, and one or more sensors 115. Each rotor blades 120A and 120B may have a marker 121A and 121B placed on the blades. The markers may be stickers, or labels, or other types of material applied to the rotor blades. The markers may also be identifying features built into the blades. The markers may also have reflective or fluorescent surfaces and may be placed on any location along the blade. The vehicle data unit 110 may be a unit that stores data related to the vehicle and may transmit and/or receive data from the mobile device 105. The vehicle data unit 110 may be an aircraft health usage and monitoring system (HUMS). A HUMS may record the status of critical systems and components on helicopters for early detection of progressive defects, or indications of defects. Data recorded by HUMS may include parameters related to take-offs, landings, engine starts, engine, gearboxes, shafts, fans, rotors systems, and other components. The HUMS may also be in communication with the one or more sensors 115 distributed through the airframe and components. Sensors may include temperature sensor, humidity sensor, vibration sensor, accelerometer, gyroscope, and/or other sensors.

FIG. 1B depicts an exemplary mobile device 105 and environment 100B in which systems, methods, and other aspects of the present disclosure may be implemented. Environment 100B may include the mobile device 105, a network 140, and a server 145. The mobile device 105 may be connected to the server 145 via network 140. Such network may be any suitable network or combination of networks and may support any appropriate protocol suitable for communication of data between various components in the system environment 100B. The network may include a public network (e.g., the Internet), a private network (e.g., a network within an organization), or a combination of public and/or private networks.

The server 145 may be one or more computers located together or separately at a location remote from the mobile device 105. The server 145 may receive images and/or videos captured by the mobile device 105 of the rotor blades 120A and 120B. The server 145 may also process the images and/or videos to determine if the rotor blades are in perfect track and if track and balance maintenance procedures are required.

The mobile device 105 may be operated by a user for track and balance procedure. The mobile device 105 may also process the images and/or videos on the device itself to determine if the rotor blades are in perfect track and if track and balance maintenance procedures are required. The mobile device 105 may include one or more cameras 131, a central processing unit 132 (CPU), a memory module 133, one or more sensors 134, and a display 135. Examples of the mobile device may include smartphones, tablet computers, laptops, PDAs, cameras, video cameras, etc. In one embodiment, the mobile device 105 may be placed inside of the rotorcraft with the rotor blades 120A and 120B and markers 121A and 121B in the field of view of the one or more cameras 131. The mobile device 105 may be placed in a mount and mounted inside of the rotorcraft, or the mobile device 105 may be built in to the cockpit of the rotorcraft, or the mobile device 105 may be handheld by a flight technician. In another embodiment, the mobile device 105 may be placed on the outside of the rotorcraft. When placed on the outside of the rotorcraft, the mobile device 105 may be placed in a fixed position and may be placed so that the rotor blades 120A and 120B and markers 121A and 121B are in the field of view of the one or more cameras 131. The mobile device 105 may also be positioned outside of the rotorcraft to monitor and measure the rotor blades displacement on multiple points along their trajectory (e.g., in front and aft of the helicopter).

The mobile device 105 may also include sensors 134 such as an accelerometer and/or gyroscope to assist the cameras 131 in stabilizing images and/or videos captured of the rotor blades. The accelerometer and/or the gyroscope may be used to estimate the device displacement in time, and process the images and/or videos for stabilization based on the device displacement in time. The accelerometers may be used to derive displacement information while gyroscopes may be used to derive angular displacement. Stabilization may also be achieved by using external objects. If there is a fixed external object present in the field of view of the camera, the object may be reference since the location of the object is known and fixed. Images and/or videos captured by the cameras 131 may be stabilized by referencing the location of the external object. In another embodiment, vibration damper material may be placed between the cameras 131 and the surface of the rotorcraft to reduce the vibration transferred from the rotorcraft to the cameras 131. Vibration damper material may include rubber, foam, polyurethane, and other materials. In another embodiment, the cameras 131 may have built-in image stabilization hardware. For example, by isolating the camera lens inside of cameras 131 in vibration damping material.

The number of cameras 131 within the mobile device 105 may have various configurations and serve different functions. For example, in an embodiment where there is one camera in the mobile device 105, then the camera may be mounted and focused only on the rotor blades of the rotorcraft. In another embodiment, the mobile device 105 may have two cameras. In this configuration, one of the cameras may be focused only on the rotor blades of the rotorcraft while the second camera may be focused on an external object for stabilization purposes. Both cameras may also be configured to focus on the rotor blades on the rotorcraft and utilize the stereoscopic vision to compute the distance of the rotor blades or other objects from the images and/or videos. The exposition of the cameras may also be adjustable. For example, if a short exposition is used, the captured images and/or videos of the rotor blades may be focused and clear. If a long exposition is used, the captured images and/or videos of the rotor blades may be blurred, but the blade trajectory may be visible in the images and/or videos. The frame rate of the cameras 131 may be adjustable based on the number of markers placed on the rotor blades. Other optical properties of the cameras 131 may also be modified or adjustable using an optical element. For example, an additional lens, a diffraction glass, or any other type of optical element may be attached to the camera 131 for changing the field of view or any other optical property of the camera 131.

As a further example, a helicopter main rotor may have a revolution per minute (RPM) rate of 250-600. If the cameras 131 can match the frame rate of the rotor RPM multiplied by the number of blades on the rotor, then the cameras 131 may capture every rotor blade every time it passes in front of the camera. In this embodiment, only one rotor blade needs to have a marker applied to the blade. The mobile device 105 may determine the total number of rotor blades on the rotorcraft from the captured images and/or videos, or from another data source (e.g., server 145). The rotor blades without markers may be references with respect to the blade with the marker. The mobile device 105 may also compute the actual RPM of the rotor based on the captured images and/or videos and adjust the camera frame rate to capture all of the rotor blades in the same position within the field of view of the cameras. If the cameras 131 have a frame rate that is lower than the rotor RPM, then all of the rotor blades may have a marker applied. The mobile device 105 may be able to identify each rotor blade by the marker captured in the images and/or videos. The mobile device 105 may also compute the actual RPM of the rotor based on the captured images and/or videos and adjust the camera frame rate to capture all of the rotor blades in the same position within the field of view of the cameras.

Figure 2A:
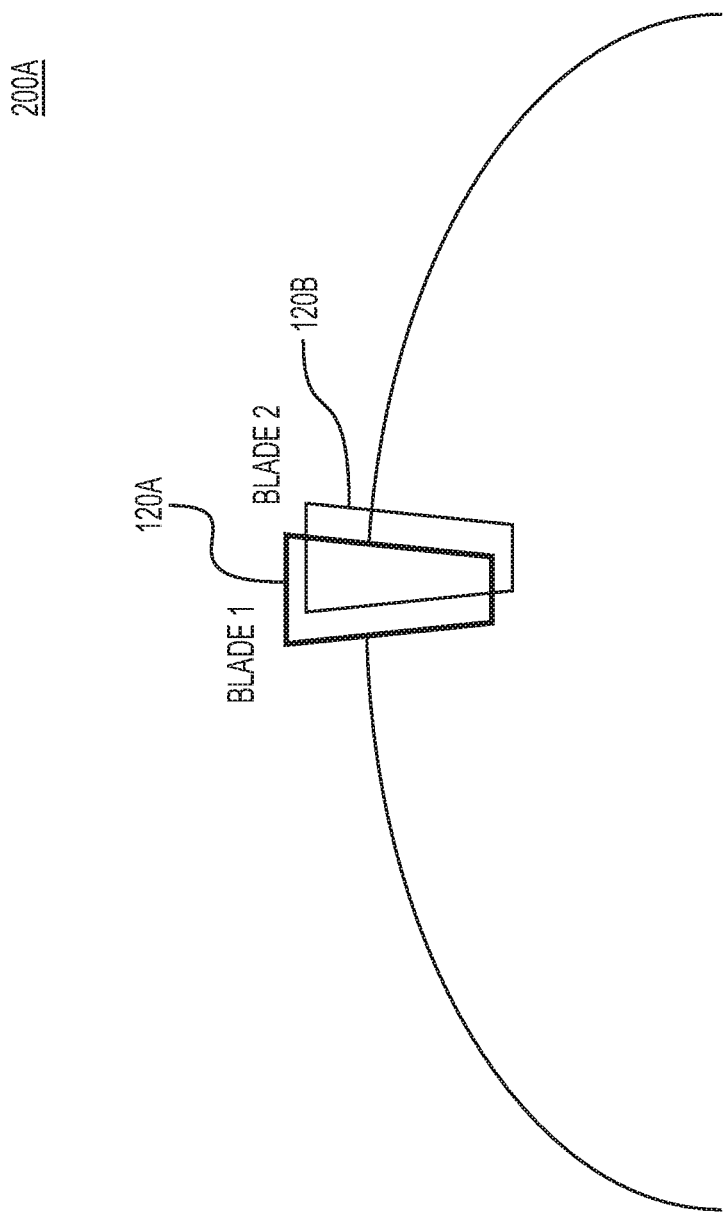
FIGS. 2A-2C depict exemplary rotor blade positions of a rotorcraft, according to one or more embodiments.
Figure 2B:
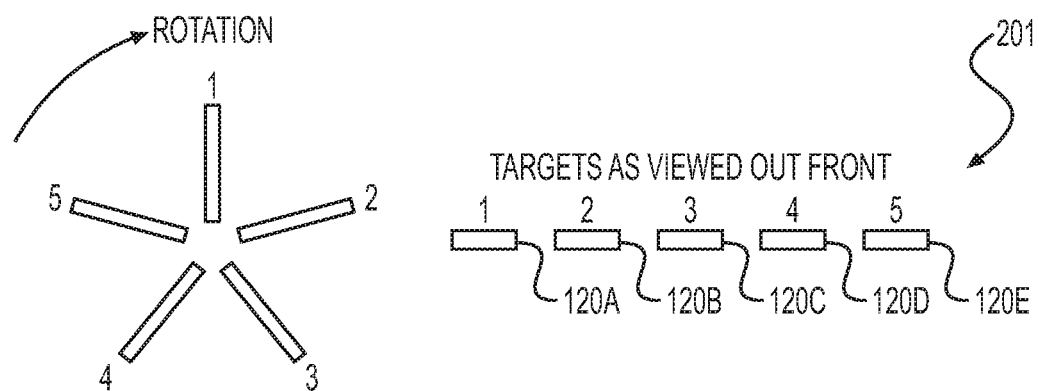
Figure 2B:
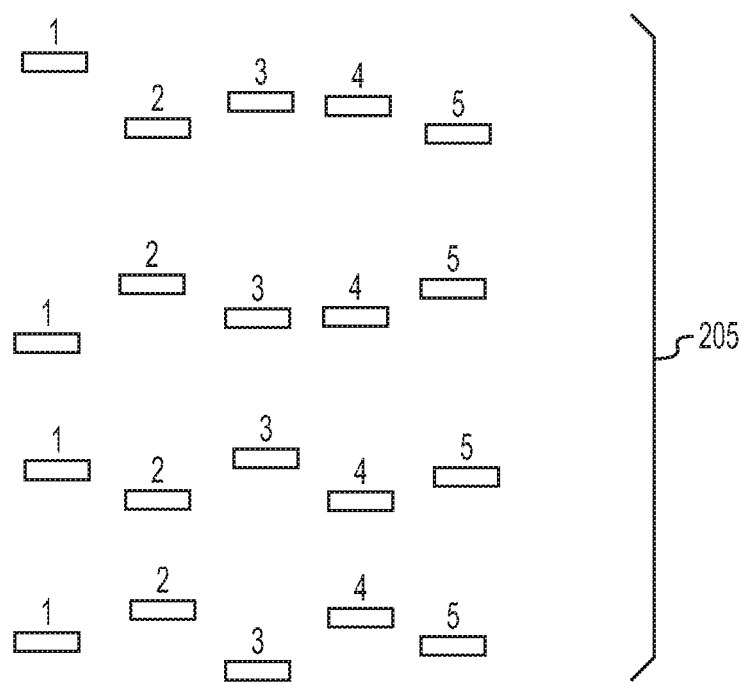
Figure 2C:
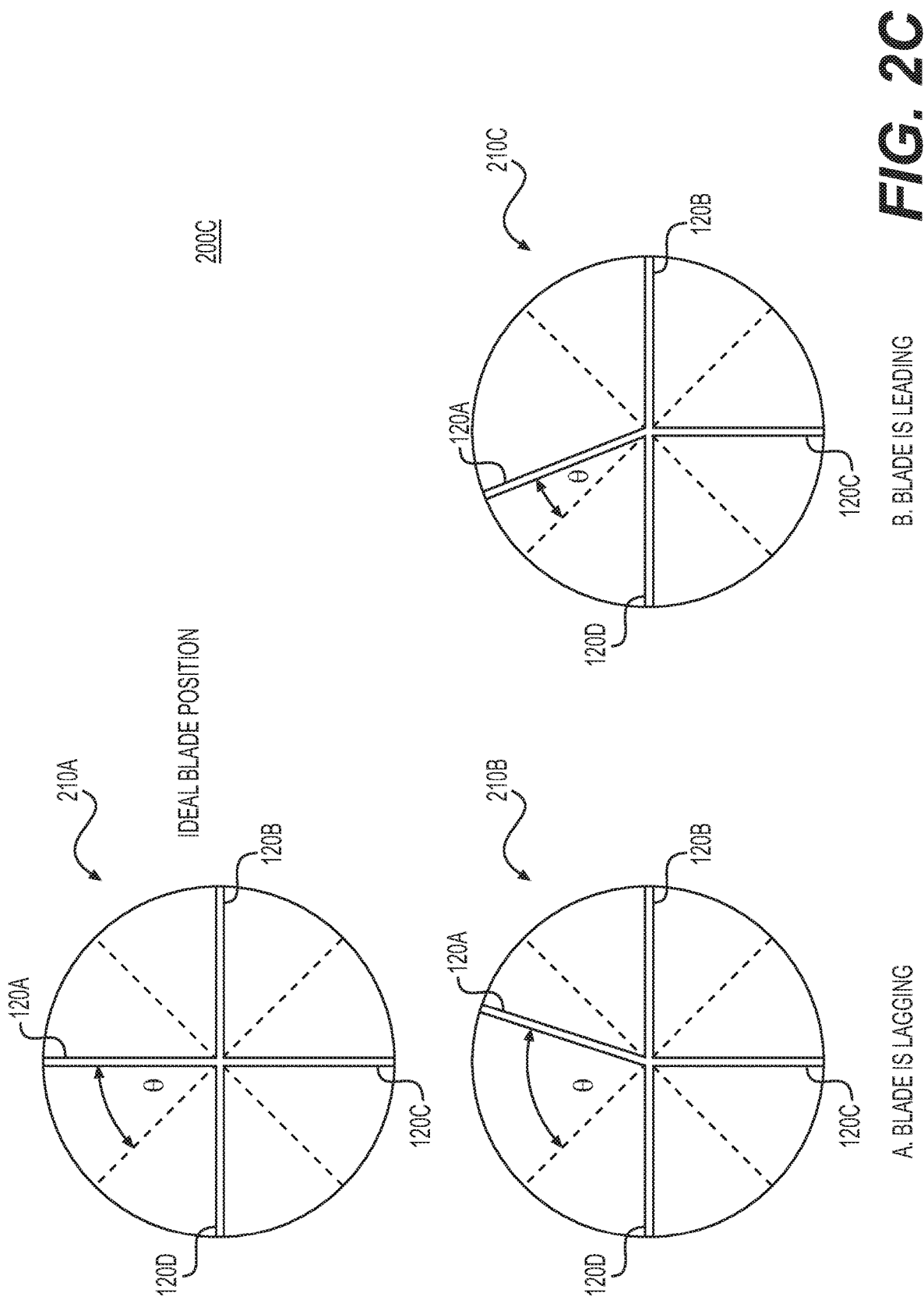

FIGS. 2A-2C depict exemplary rotor blade positions of a rotorcraft, according to one or more embodiments. FIG. 2A may depict an exemplary image 200A of blades 120A and 120B captured above or below the blades. The exemplary image 200A may represent blades that are out of track (e.g., not in the same plane) due to the offset of blade 120A from blade 120B. FIG. 2B may depict an exemplary image 200B of a 5 blade rotorcraft with blades 120A-120E captured from the front of the rotorcraft. Reference number 201 may depict an example of the blades 120A-120E that are in perfect track (e.g., in the same plane). Reference number 205 may depict examples of blades 120A-120E that are out of track (e.g., not in the same plane).

FIG. 2C may depict exemplary blade positions on a 4 rotor rotorcraft. Reference number 210A may represent the ideal blade position for blades 120A-120D. The ideal blade position may represent when the rotor blades has perfect track and in balance with rotor angle $\theta$. Reference number 210B may represent an exemplary embodiment where one of the blades is lagging (e.g., blade 120A with a greater angle $\theta$). Reference number 210C may represent an exemplary embodiment where one of the blades is leading (e.g., blade 120A with a smaller angle $\theta$). When making adjustments to the rotors blades, any adjustment may affect the track and balance of the blades. For example, to improve the track of the blades, the blades may be raised or lowered. Such adjustment may increase or decrease the amount of pitch of the blades. An increase in the pitch of the blade may lead to an increase in the amount of drag acted on the blade. The increase in drag may move the blade aft (e.g., lag) of its original position. A decrease in the pitch of the blade may lead to an decrease in the amount of drag acted on the blade. The decrease in drag may move the blade forward (e.g., lead) of its original position. This lead/lag effect may result in a change in the lateral balance of the rotor disk. When the images and/or videos captured by the mobile device 105 show blade lead and/or blade lag, as depicted by 210B and 210C, it may be an indication of blades out of track, and a track and balance maintenance procedure may need to be performed.

Figure 3:
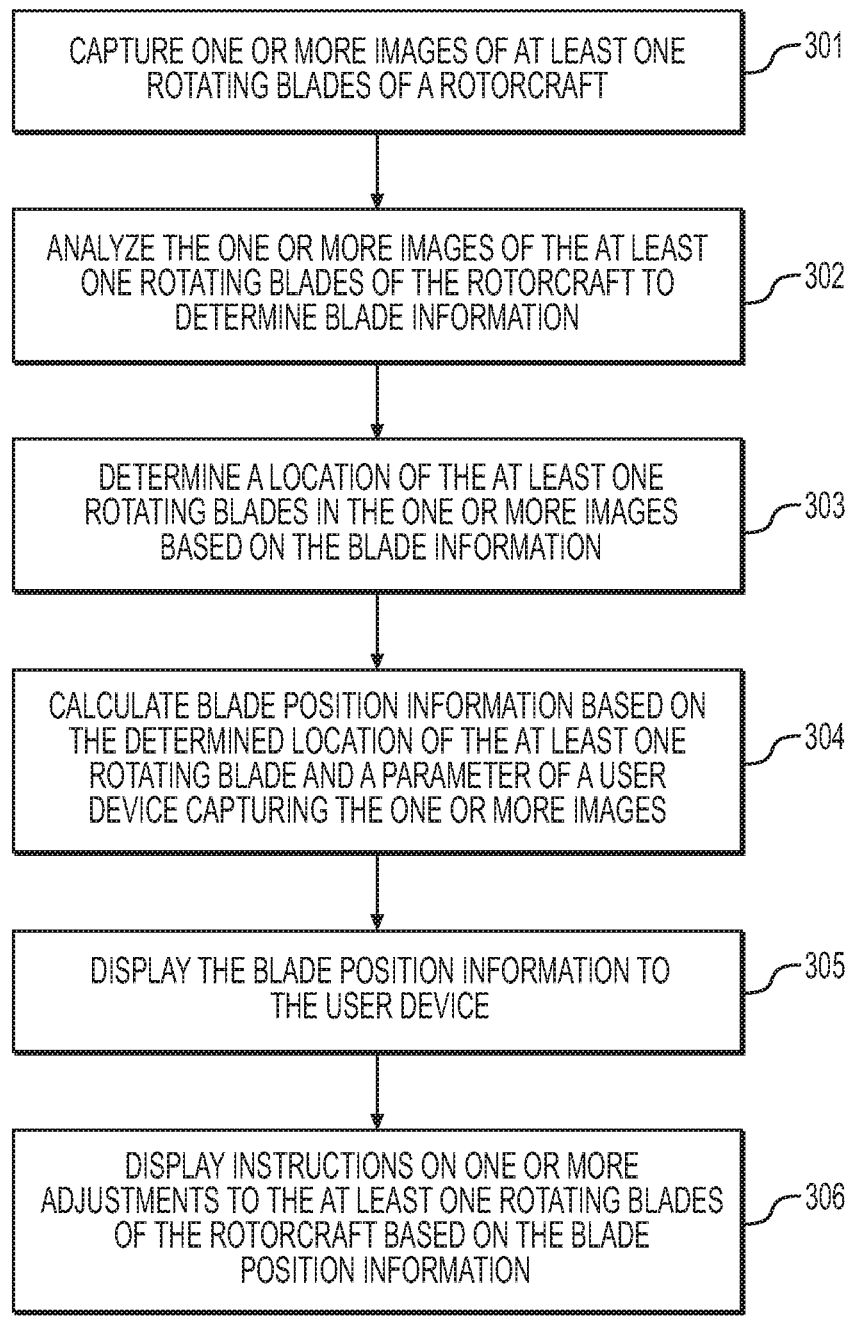
FIG. 3 depicts an exemplary flowchart of a method for rotor blade track and balance, according to one or more embodiments.

FIG. 3 depicts an exemplary flowchart of a method 300 for rotor blade track and balance, according to one or more embodiments. Method 300 may begin at step 301 where one or more images of at least one rotating blades of a rotorcraft are captured by the mobile device 105. In the present method 300, captured images may include both pictures and/or videos. Prior to capturing images of the at least one rotating blades, a calibration step may be performed on the mobile device 105. The calibration step may include gathering various data parameters of the mobile device 105 to be used in the steps of method 300. The various data parameters may include the image resolution, the focal length of the lenses, and any image distortion caused by the lenses of the cameras 131. The data parameters may also include the location of the cameras 121 with respect to the rotor. For example, whether the mobile device 105 is positioned inside or outside of the rotorcraft, whether the mobile device 105 is attached to the frame of the rotorcraft, or attached to the ground, or handheld by an operator. Position of the mobile device 105 relative to the center of the rotor may also be determined. For example, if the mobile device 105 is placed outside of the rotorcraft, the position may be calculated from the distance to the rotorcraft and height of the device above ground. The distances may be entered by an operator or may be inferred from objects in the field of view of the cameras 131. If the mobile device 105 is placed inside of the rotorcraft, the distance may be determined by measuring the precise distance of the mobile device from several known points in the flight deck of the rotorcraft and the device position may be inferred from those distances. The distance may also be determined by placing the mobile device 105 in a known pre-determined position inside of the flight deck. The distance may also be determined automatically by the mobile device 105, for example, the mobile device 105 may use the cameras 131 to calculate its distance from within the flight deck. The angle relative to the horizontal and vertical axis of the rotor that the mobile device 105 is mounted at may also be determined. The accelerometer sensor within the mobile device 105 may be used to measure the acceleration of Earth, and the camera pitch and roll angles may be calculated from the accelerometer data. The yaw of the mobile device 105 relative to the rotorcraft may be calculated from the trajectory of the rotor blades as captured by the cameras 131.

The capturing of one or more images of at least one rotating blades of step 301 may be performed upon a request of an operator, or a request from a connected external system (e.g., vehicle data unit 110 or server 145) or may be performed automatically by the mobile device 105. The images may be taken as a series of images on either slow and/or fast shutter speed of the cameras 131. Along with the images of the at least one rotating blades, other data such as the acceleration and gyroscopic forces acting on the mobile device 105 may be detected by the sensors 134 and also recorded. The mobile device 105 may also alert the operator if the device is mis-positioned. For example, if the cameras 131 do not detect any moving rotor blades in the field of view or in the captured images, a notification or an alert may be displayed by the mobile device 105 to indicate that the mobile device might need to be repositioned.

At step 302, the one or more images of the at least one rotating blades of the rotorcraft may be analyzed to determine blade information. As part of the analysis step, the captured images may also be processed to minimize any errors that might have been captured by the cameras 131. For example, any image distortion caused by the camera lenses may be corrected, blurred rotor blades may be sharpened, and movement of the mobile device 105 due to vibration may be compensated.

At step 303, the location of the at least one rotating blades in the one or more images may be determined based on the blade information. The location of the blades may also include determining the location of the markers 121A or 121B if applied on to the rotor blades. Based on the location determination, at step 304 position information of the at least one rotating blades may be calculated using the various data parameters of the mobile device 105 collected. The position information may include the horizontal and vertical angles relative to the central optical axis of the camera. The computed angles may then be used to calculate the height of the blade tip using the relative position and rotation of the mobile device 105. The computing process may be repeated for all of the captured images until sufficient information about all of the rotor blade tips are calculated. The position information may be computed using various methods and/or types of information, including, for example blade angular information, computing the relative vertical blade distances based on the pixel size at the distance of the blade tips, using machine learning algorithms, or any other method or information may be used to calculate the position information. Upon determining the height of the blade tips, the calculated data may be transmitted to other systems for processing of the track and balance procedure. The calculated data may be transmitted to the vehicle data unit 110 or server 145, or other processing systems authorized to receive the calculated data.

At step 305, the calculated blade position information may be displayed on the mobile device 105 operated by a user or an operator. For example, the mobile device 105 may display the height value of each of the rotor blade tips or may display the vertical separation of the rotor blades relative to each other. The mobile device 105 may also use color coding to display whether the blade tips are in perfect track. For example, the blade tips with the same height value may be highlighted in green while blade tips with different height values may be highlighted in red. At step 306, instructions on one or more adjustments to the at least one rotating blades of the rotorcraft based on the blade position information may be displayed on the mobile device 105 operated by the user or operator. For example, instructions may include a diagram of adjustments needed, or may include pictures of the rotorcraft components that require adjustment, or may include a video of the adjustment steps.

Figure 4A:
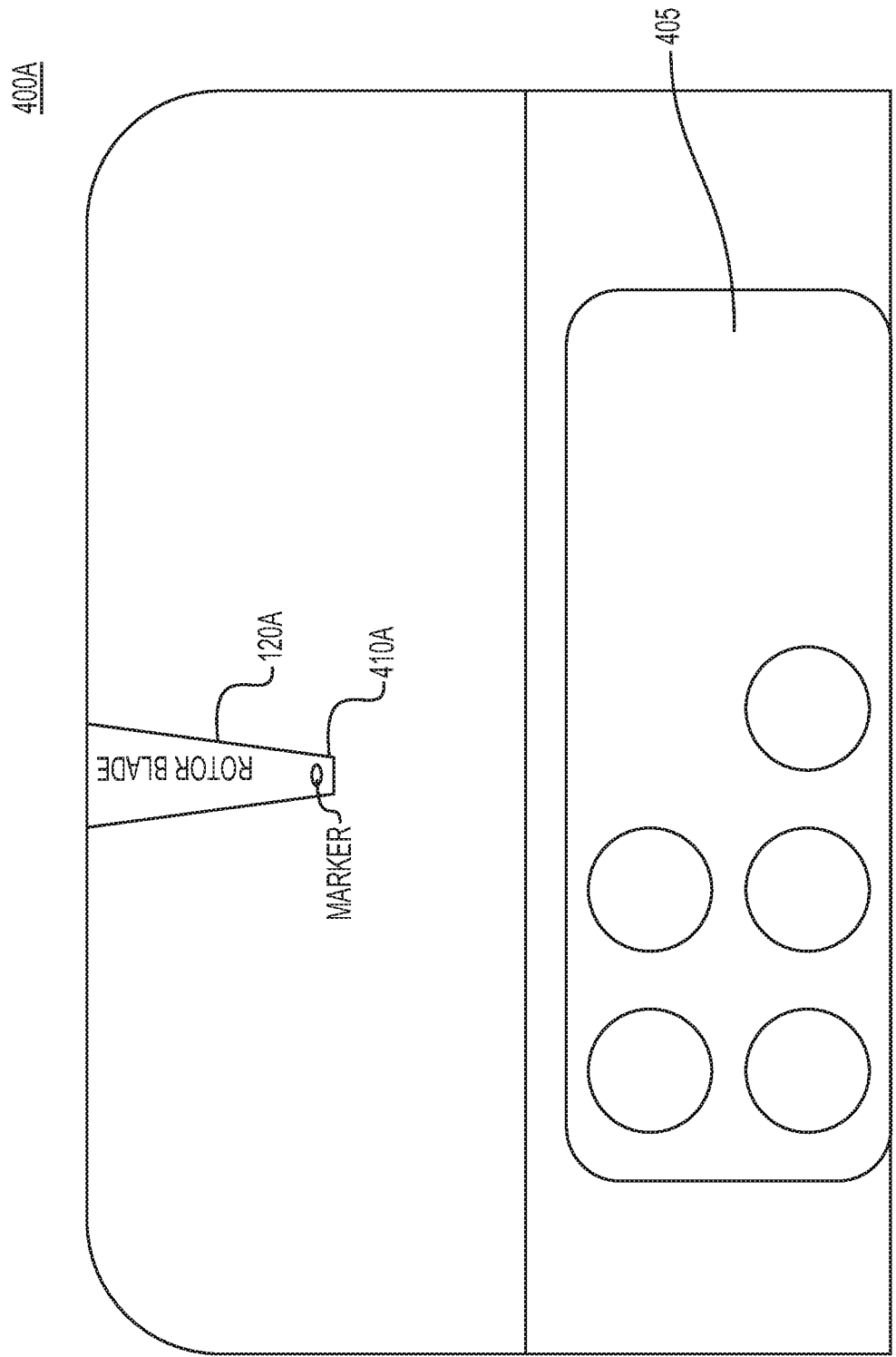
FIGS. 4A-4C depict exemplary diagrams for performing rotor blade track and balance, according to one or more embodiments.
Figure 4B:
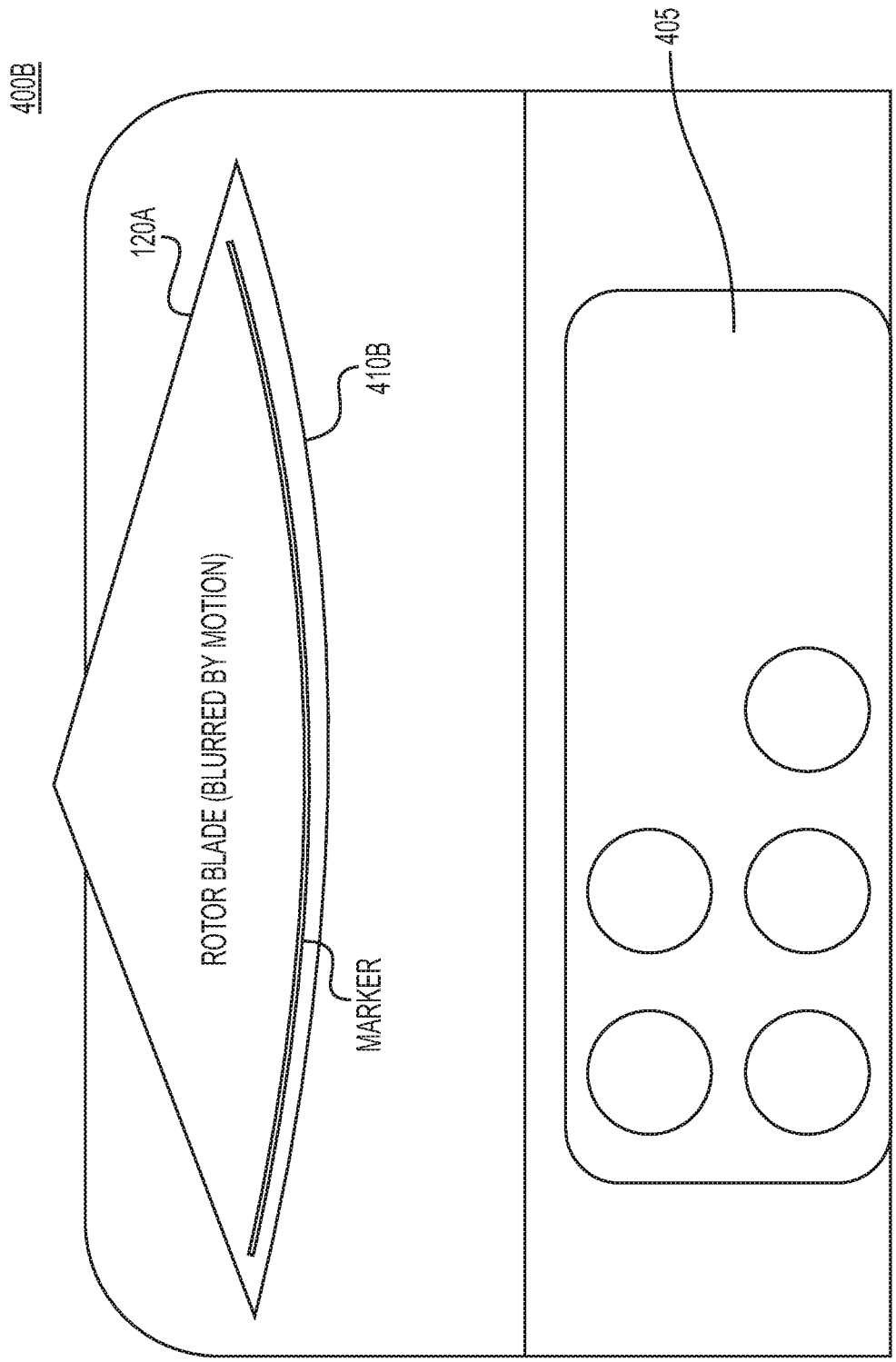
Figure 4C:
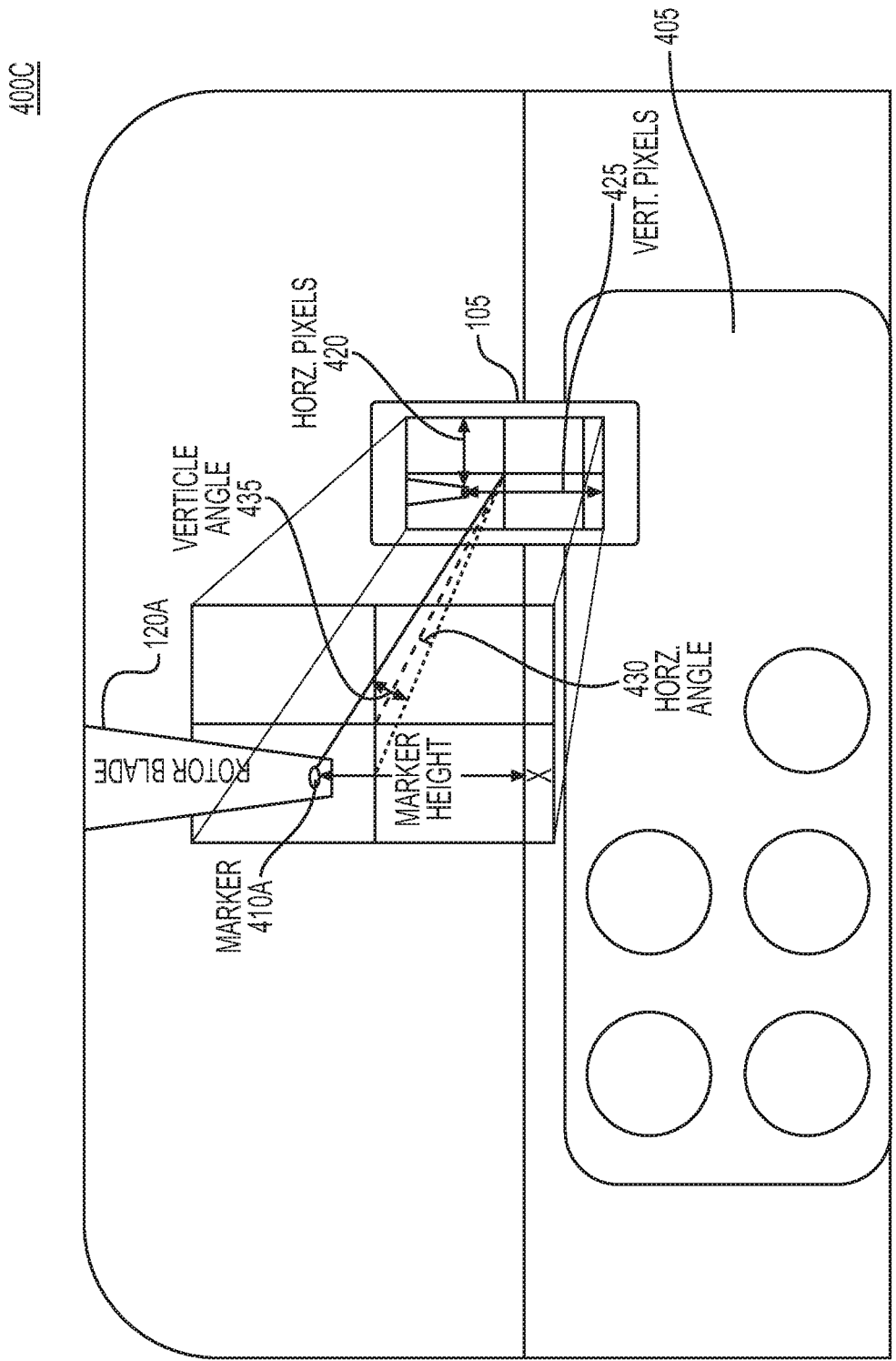

FIGS. 4A-4C depict exemplary diagrams for performing rotor blade track and balance, according to one or more embodiments. FIG. 4A may depict an exemplary view of the mobile device 105 positioned inside of the flight deck of the rotorcraft. The exemplary view may include an instrument panel 405, a rotor blade 120A, and marker 410A place on the rotor blade 120A. FIG. 4A may also depict an exemplary image 400A captured by the cameras 131 located on the mobile device 105. The image 400A may include an instrumentation panel 405, a rotor blade 120A, and marker 410A placed on the rotor blade 120A. The image 400A may be a representation of an image taken with a short exposition of the cameras 131 as indicated by the captured rotor blade 120A that is sharp and in focus. FIG. 4B may depict an exemplary image 400B captured by the cameras 131 located on the mobile device 105. The image 400B may include an instrumentation panel 405, a rotor blade 120A, and marker 410A placed on the rotor blade 120A. The image 400B may be a representation of an image taken with a long exposition of the cameras 131 as indicated by the captured rotor blade 120A that is blurred by motion.

FIG. 4C may depict an exemplary diagram 400C for determining the height of the rotor blades. Diagram 400C may include an instrumentation panel 405, a mobile device 105 mounted in the flight deck of the rotorcraft, a rotor blade 120A, and marker 410A placed on the rotor blade 120A. The mobile device 105 may display the captured image of the rotor blade 120A, and using the various data parameters of the mobile device to calculate the height "x" of the rotor blade 120A. The calculation may use the horizontal pixels 420 and vertical pixels 425 of the mobile device 105 to calculate the horizontal angle 430 and vertical angle 435 of the rotor blade 120A to the central optical axis of the camera 131. Upon determining the horizontal angle 430 and vertical angle 435, the height "x" of the rotor blade 120A may be calculated and determined.

Figure 5:
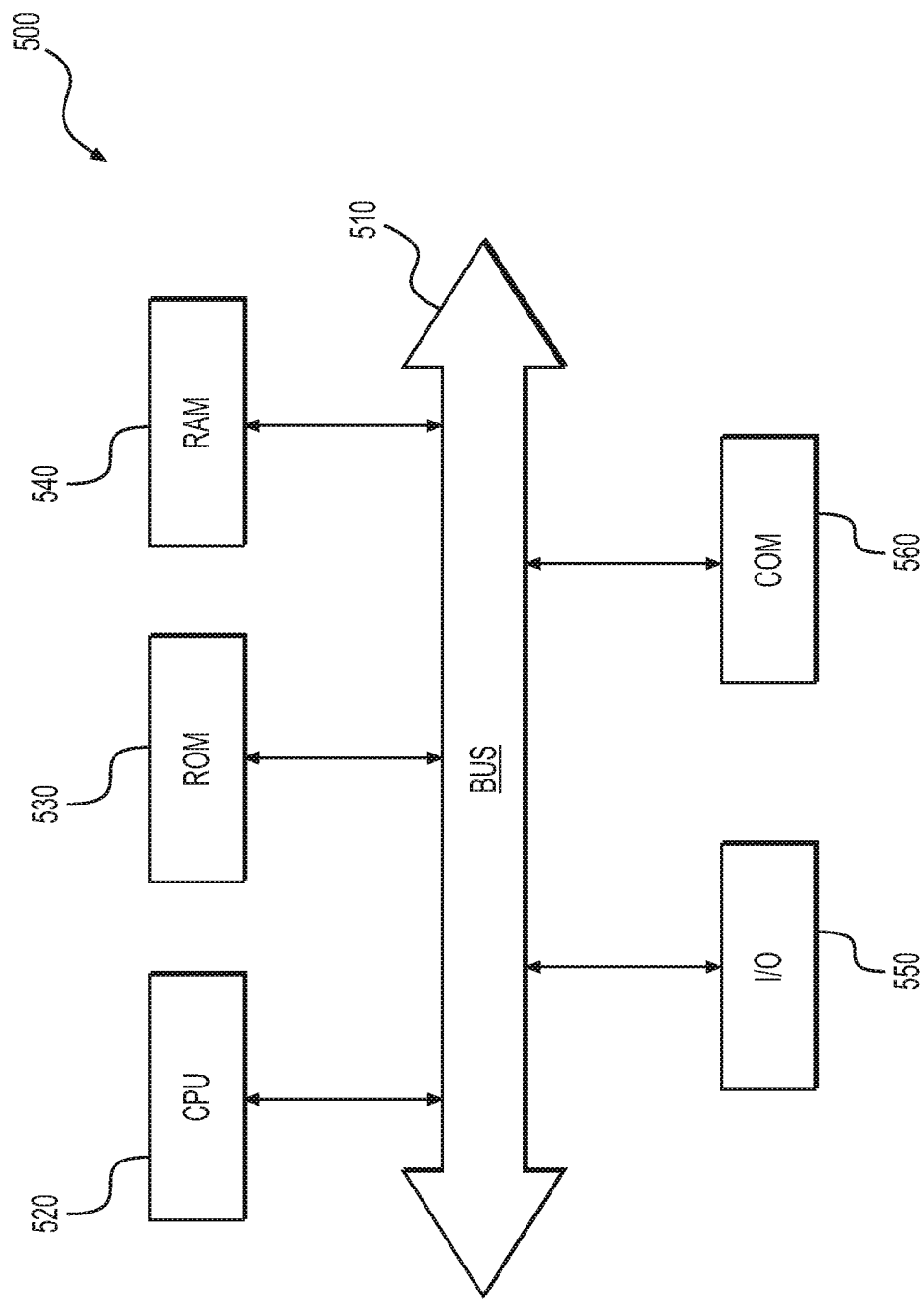
FIG. 5 depicts an exemplary computer device or system, in which embodiments of the present disclosure, or portions thereof, may be implemented

FIG. 5 depicts a high-level functional block diagram of an exemplary computer device or system, in which embodiments of the present disclosure, or portions thereof, may be implemented, e.g., as computer-readable code. In some implementations, the mobile device 105 may correspond to device 500. Additionally, each of the exemplary computer servers, databases, user interfaces, modules, and methods described above with respect to FIGS. 1-4 can be implemented in device 500 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-4.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-4, may be implemented using device 500. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 5, device 500 may include a central processing unit (CPU) 520. CPU 520 may be any type of processor device including, for example, any type of special purpose or a general-purpose microprocessor device. As will be appreciated by persons skilled in the relevant art, CPU 520 also may be a single processor in a multi-core/multi-processor system, such system operating alone, or in a cluster of computing devices operating in a cluster or server farm. CPU 520 may be connected to a data communication infrastructure 510, for example, a bus, message queue, network, or multi-core message-passing scheme.

Device 500 also may include a main memory 540, for example, random access memory (RAM), and also may include a secondary memory 530. Secondary memory 530, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 530 may include other similar means for allowing computer programs or other instructions to be loaded into device 500. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 500.

Device 500 also may include a communications interface ("COM") 560. Communications interface 560 allows software and data to be transferred between device 500 and external devices. Communications interface 560 may include a modem, a network interface (such as an Ethernet card), a communications port, a PCMCIA slot and card, or the like. Software and data transferred via communications interface 560 may be in the form of signals, which may be electronic, electromagnetic, optical, or other signals capable of being received by communications interface 560. These signals may be provided to communications interface 560 via a communications path of device 500, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 500 also may include input and output ports 550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method for rotorcraft track and balance, the method comprising:
   capturing, by one or more processors, one or more images of at least one rotating blade of a rotorcraft;
   analyzing, by the one or more processors, the one or more images of the at least one rotating blade of the rotorcraft to determine blade information;
   determining, by the one or more processors, a location of the at least one rotating blade in the one or more images based on the blade information;
   calculating, by the one or more processors, blade position information based on the determined location of the at least one rotating blade and a parameter of a user device capturing the one or more images, wherein the calculating further comprises calculating, by the one or more processors, horizontal and vertical angles of the at least one rotating blade relative to a central optical axis of the user device, and determining, by the one or more processors, a height of the at least one rotating blade based on the calculated horizontal and vertical angles of the at least one rotating blade;
   displaying, by the one or more processors, the blade position information to the user device; and
   displaying, by the one or more processors, instructions on one or more adjustments to the at least one rotating blade of the rotorcraft based on the blade position information.

2. The computer-implemented method of claim 1, wherein the user device is positioned inside the rotorcraft.

3. The computer-implemented method of claim 1, wherein the parameter of the user device include at least one of, a number of cameras, a location of the user device, an image resolution of the user device, pixel size of the user device, and/or a focal length of the user device.

4. The computer-implemented method of claim 1, wherein calculating the blade position information further comprises calculating at least one of,
   blade angular information, a relative vertical distance of the at least one rotating blade, and an absolute height of the at least one rotating blade.

5. The computer-implemented method of claim 1, wherein calculating the horizontal and vertical angles of the at least one rotating blade relative to the central optical axis of the user device further omprises:
   calculating, by the one or more processors, the horizontal and vertical angles of the at least one rotating blade by using horizontal pixels and vertical pixels of the user device.

6. The computer-implemented method of claim 1, wherein calculating blade position information further comprises receiving, by the one or more processors, data from one or more sensors located on the rotorcraft.

7. The computer-implemented method of claim 1, wherein determining the location of the at least one rotating blade further comprises identifying a marker placed on the at least one rotating blade.

8. A computer-implemented system for rotorcraft track and balance, the computer-implemented system comprising:
   a memory having processor-readable instructions stored therein; and
   at least one processor configured to access the memory and execute the processor-readable instructions, which when executed by the processor configures the processor to perform a plurality of functions, including functions to:
   capture one or more images of at least one rotating blade of a rotorcraft;
   analyze the one or more images of the at least one rotating blade of the rotorcraft to determine blade information;
   determine a location of the at least one rotating blade in the one or more images based on the blade information;
   calculate blade position information based on the determined location of the at least one rotating blade and a parameter of a user device capturing the one or more images, wherein the function to calculate further comprises a function to calculate horizontal and vertical angles of the at least one rotating blade relative to a central optical axis of the user device, and determine a height of the at least one rotating blade based on the calculated horizontal and vertical angles of the at least one rotating blade;
   display the blade position information to the user device; and
   display instructions on one or more adjustments to the at least one rotating blade of the rotorcraft based on the blade position information.

9. The computer-implemented system of claim 8, wherein the user device is positioned inside the rotorcraft.

10. The computer-implemented system of claim 8, wherein the parameter of the user device include at least one of, a number of cameras, a location of the user device, an image resolution of the user device, pixel size of the user device, and/or a focal length of the user device.

11. The computer-implemented system of claim 8, wherein the function to calculate the blade position information further comprises calculating at least one blade angular information, a relative vertical distance of the at least one rotating blade, and an absolute height of the at least one rotating blade.

12. The computer-implemented system of claim 8, wherein the function to calculate the horizontal and vertical angles of the at least one rotating blade relative to the central optical axis of the user device further comprises:
a function to calculate the horizontal and vertical angles of the at least one rotating blade by using horizontal pixels and vertical pixels of the user device.

13. The computer-implemented system of claim 8, wherein the function to calculate blade position information further comprises a function to receive data from one or more sensors located on the rotorcraft.

14. The computer-implemented system of claim 8, wherein the function to determine the location of the at least one rotating blade further comprises a function to identify a marker placed on the at least one rotating blade.

15. A non-transitory computer-readable medium containing instructions for rotorcraft track and balance, comprising:
capturing, by one or more processors, one or more images of at least one rotating blade of a rotorcraft;
analyzing, by the one or more processors, the one or more images of the at least one rotating blade of the rotorcraft to determine blade information;
determining, by the one or more processors, a location of the at least one rotating sblade in the one or more images based on the blade information;
calculating, by the one or more processors, blade position information based on the determined location of the at least one rotating blade and a parameter of a user device capturing the one or more images, wherein the calculating further comprises calculating, by the one or more processors, horizontal and vertical angles of the at least one rotating blade relative to a central optical axis of the user device, and determining, by the one or more processors, a height of the at least one rotating blade based on the calculated horizontal and vertical angles of the at least one rotating blade;
displaying, by the one or more processors, the blade position information to the user device; and
displaying, by the one or more processors, instructions on one or more adjustments to the at least one rotating blade of the rotorcraft based on the blade position information.

16. The non-transitory computer-readable medium of claim 15, wherein the user device is positioned inside the rotorcraft.

17. The non-transitory computer-readable medium of claim 15, wherein the parameter of the user device include at least one of, a number of cameras, a location of the user device, an image resolution of the user device, pixel size of the user device, and/or a focal length of the user device.

18. The non-transitory computer-readable medium of claim 15, wherein calculating the blade position information further comprises calculating at least one of,
blade angular information, a relative vertical distance of the at least one rotating blade, and an absolute height of the at least one rotating blade.

19. The non-transitory computer-readable medium of claim 15, wherein calculating the horizontal and vertical angles of the at least one rotating blade relative to the central optical axis of the user device further comprises:
calculating, by the one or more processors, the horizontal and vertical angles of the at least one rotating blade by using horizontal pixels and vertical pixels of the user device.

20. The non-transitory computer-readable medium of claim 15, wherein calculating blade position information further comprises receiving, by the one or more processors, data from one or more sensors located on the rotorcraft.

* * * * *